US009571261B2

(12) United States Patent
Xu et al.

(10) Patent No.: US 9,571,261 B2
(45) Date of Patent: *Feb. 14, 2017

(54) METHOD AND APPARATUS FOR PERFORMING CARRIER MANAGEMENT IN CARRIER AGGREGATION SYSTEM

(71) Applicant: FUJITSU LIMITED, Kawasaki-shi, Kanagawa (JP)

(72) Inventors: Haibo Xu, Beijing (CN); Yuantao Zhang, Beijing (CN); Hua Zhou, Beijing (CN); Jianming Wu, Beijing (CN); Yoshiaki Ohta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,860

(22) Filed: Apr. 12, 2016

(65) Prior Publication Data

US 2016/0248573 A1    Aug. 25, 2016

Related U.S. Application Data

(63) Continuation of application No. 14/556,862, filed on Dec. 1, 2014, now Pat. No. 9,344,261, which is a (Continued)

(51) Int. Cl.
*H04L 5/00* (2006.01)
*H04W 24/08* (2009.01)
(Continued)

(52) U.S. Cl.
CPC ............ *H04L 5/0098* (2013.01); *H04L 5/001* (2013.01); *H04L 5/006* (2013.01); *H04L 5/0044* (2013.01);
(Continued)

(58) Field of Classification Search
CPC ........ H04L 5/001; H04L 5/0044; H04L 5/006; H04L 5/0098; H04W 24/08; H04W 72/0453; H04W 24/10
(Continued)

(56) References Cited

U.S. PATENT DOCUMENTS 6,167,270 A     12/2000  Rezaiifar et al.
9,344,261 B2 *   5/2016  Xu .......................... H04L 5/001
(Continued)

FOREIGN PATENT DOCUMENTS

CN    101465720 A    6/2009
CN    101616484 A    12/2009
(Continued)

OTHER PUBLICATIONS

Samsung: "The need for additional activation procedure in carrier aggregation", Agenda Item: 7.3.4, Oct. 12-16, 2009, 3GPP TSG-RAN2#67bis, R2-095874, Miyazaki, Japan.
(Continued)

*Primary Examiner* — Andrew Lai
*Assistant Examiner* — Albert Shih
(74) *Attorney, Agent, or Firm* — Myers Wolin, LLC

(57) ABSTRACT

A carrier aggregation system, includes transmitting a first signaling to configure one additional carrier to a user equipment (UE) at which the additional carriers are deactivated, to configure a timer to each additional carrier for the UE by which the carrier is deactivated after the corresponding timer expiry; transmitting a second signaling that carries an activation indication to the UE to activate one deactivated additional carrier in the configured carriers for the UE; activating at least one deactivated additional carrier, starting the timer, controlling the UE to start Physical Downlink Control Channel (PDCCH) monitoring and Physical Downlink Shared Channel (PDSCH) receiving on the activated
(Continued)

additional carrier; transmitting PDCCH on the activated additional carrier for the UE, by which the corresponding timer being restarted; deactivating the activated carrier after the corresponding timer expiry, controlling the UE to stop the PDCCH monitoring and the PDSCH receiving on the deactivated additional carrier.

5 Claims, 9 Drawing Sheets

Related U.S. Application Data continuation of application No. 13/544,464, filed on Jul. 9, 2012, now Pat. No. 8,937,895, which is a continuation of application No. PCT/CN2010/070091, filed on Jan. 8, 2010.

(51) Int. Cl.
*H04W 72/04* (2009.01)
*H04W 24/10* (2009.01)

(52) U.S. Cl.
CPC .......... *H04L 5/0064* (2013.01); *H04L 5/0087* (2013.01); *H04W 24/08* (2013.01); *H04W 72/042* (2013.01); *H04L 5/0085* (2013.01); *H04W 24/10* (2013.01); *H04W 72/0453* (2013.01)

(58) Field of Classification Search
USPC ......................................................... 370/329
See application file for complete search history.

(56) References Cited

U.S. PATENT DOCUMENTS

| | | | |
|---|---|---|---|
| 2009/0026883 A1 | 1/2009 | Croft et al. | |
| 2009/0092091 A1 | 4/2009 | Balasubramanian | |
| 2009/0219910 A1 | 9/2009 | Han et al. | |
| 2009/0253470 A1 | 10/2009 | Xu | |
| 2009/0257387 A1* | 10/2009 | Gholmieh | H04L 5/0053 370/329 |
| 2009/0257517 A1 | 10/2009 | Nordstrom et al. | |
| 2010/0118720 A1* | 5/2010 | Gauvreau | H04W 72/048 370/252 |
| 2012/0250559 A1* | 10/2012 | Wu | H04L 5/0007 370/252 |
| 2012/0250562 A1* | 10/2012 | Li | H04W 24/10 370/252 |
| 2012/0327910 A1* | 12/2012 | Dalsgaard | H04L 5/0098 370/335 |

FOREIGN PATENT DOCUMENTS

| | | |
|---|---|---|
| RU | 2335851 C2 | 6/2005 |
| WO | 2009/022882 | 2/2009 |
| WO | 2009/120123 A1 | 10/2009 |

OTHER PUBLICATIONS

Ericsson, ST-Ericsson: "Activation and deactivation of component carriers", Agenda item: 7.3.3, Oct. 9-13, 2009, 3GPP TSG-RAN WG2 #68, R2-096752, Jeju, Korea.
Ericsson, ST-Ericsson: "DRX with Carrier Aggregation in LTE-Advanced", Agenda item: 7.3.3, Oct. 12-16, 2009, 3GPP TSG-RAN WG2 #67bis, R2-095809, Miyazaki, Japan.
First Office Action issued for corresponding Taiwan Patent Application No. 099114796 issued Jun. 21, 2013 with English translation.
Office Action issued for corresponding Canadian Patent Application No. 2,786,653, issued on Jun. 16, 2014.
Ericsson et al., "Activation and deactivation of component carriers", Agenda Item: 7.3.3, Oct. 9-13, 2009, 3GPP TSG-RAN WG2 #68, Tdoc R2-096752, Jeju, Korea.
First Notificaiton of Office Action issued for corresponding Chinese Patent Application No. 201080060477.9, issued Oct. 30, 2013, with an English translation.
2nd Office Action and 2nd report issued for corresponding Chinese Patent Application No. 201080060477.9, mailed Jul. 10, 2014, with an English translation.
InterDigital, "DRX Procedures for Carrier Aggregation", Agenda Item: 7.3, Discussion and Decision; R2-094217, 3GPP TSG-RAN WG2 Meeting #67, Shen Zhen, China, Aug. 24-28, 2009.
Notice of Preliminary Rejection issued for corresponding Korean Patent Application No. 10-2012-7020880, mailed Feb. 6, 2014, with an English translation.
Notice of Preliminary Rejection issued for corresponding Korean Patent Application No. 10-2014-7009104, mailed Jul. 1, 2014, with an English translation.
Notice of Preliminary Rejection issued for corresponding Korean Patent Application No. 10-2014-7009103, mailed Jul. 1, 2014, with an English translation.
Office Action issued for corresponding Mexican patent application No. MX/a/2012/008020, with English translation.
Office Action issued for corresponding Russian Patent Application No. 2012133972/07, issued Jan. 10, 2014, with an English translation.
Second Office Action issued for corresponding Taiwanese Patent Application No. 99114796, issue date of Jan. 10, 2014, with an English translation.
Samsung, "The need for additional activation procedure in carrier aggregation", Agenda Item: 7.3.4, Oct. 12-16, 2009, R2-095874, 3GPP TSG-RAN meeting #67bis, Miyazaki, Japan.
Final Office Action issued by the United States Patent and Trademark Office for corresponding U.S. Appl. No. 13/544,464, on Apr. 25, 2014.
Non-Final Office Action issued by the United States Patent and Trademark Office for corresponding U.S. Appl. No. 13/544,464, on Sep. 12, 2013.
International Search Report issued for corresponding International Patent Application No. PCT/CN2010/070091, mailed Oct. 21, 2010, with an English Translation.
Extended European search report with supplementary European search report and the European search opinion issued by the European Patent Office for corresponding European Patent Application No. 10841889.8, mailed on Mar. 18, 2016.
Third Notification of Office Action issued for corresponding Chinese Patent Application No. 201080060477.9 dated Dec. 11, 2014, with an English translation.
InterDigital et al., "Scheduling and DRX Operation for Carrier Aggregation", Agenda Item: 7.3.3, 3GPP TSG-RAN WG2 Meeting #68, R2-096583, Jeju, Korea, Nov. 9-13, 2009.
LG Electronics, "Carrier Assignment for LTE-Advanced UEs", Agenda Item: 7.2.4, 3GPP TSG-RAN WG1 Meeting #59, R1-094782, Jeju, Korea, Nov. 9-13, 2009.
Research in Motion UK Limited, "DRX Operation for Carrier Aggregation", Agenda Item: 7.3.3, 3GPP TSG-RAN WG2 Meeting #68, R2-096884, Jeju, Korea, Nov. 9-13, 2009.
Official Action issued by Rospatent Federal Service for Intellectual Property for corresponding Russian Patent Application No. 2014127681/07(044744), mailed Apr. 28, 2015, with an English translation.
NEC, "Component carrier configuration/activation for carrier aggregation", Agenda Item: 7.3, 3GPP TSG-RAN2 Meeting #66bis, R2-093697, Los Angeles, USA, Jun. 29-Jul. 3, 2009.
Non-Final Office Action issued by the United States Patent & Trademark Office on Oct. 8, 2015, for corresponding U.S. Appl. No. 14/556,862.
Notice of Allowance issued by the United States Patent & Trademark Office on Feb. 11, 2016, for corresponding U.S. Appl. No. 14/556,862.
First Office Action issued by the European Patent Office for corresponding European Patent Application No. 10841889.8, mailed on Nov. 21, 2016.

(56) References Cited

OTHER PUBLICATIONS

Office Action issued by Rospatent Federal Service for Intellectual Property for corresponding Russian Patent Application No. 2016103601/07(005607), mailed on Oct. 17, 2016, with an English translation.

* cited by examiner

METHOD AND APPARATUS FOR PERFORMING CARRIER MANAGEMENT IN CARRIER AGGREGATION SYSTEM

CROSS-REFERENCE TO RELATED APPLICATIONS

This application is a continuation of U.S. application Ser. No. 14/556,862, which was filed on Dec. 1, 2014, now pending, which is a continuation of U.S. application Ser. No. 13/544,464, filed Jul. 9, 2012, now U.S. Pat. No. 8,937,895, which issued on Jan. 20, 2015, which is a continuation of International Application No. PCT/CN2010/070091, filed on Jan. 8, 2010, the contents of each are herein wholly incorporated by reference.

FIELD OF THE INVENTION

The present invention relates to a wireless communication technique, and in particular, to a method and an apparatus for performing a carrier management in a carrier aggregation system.

BACKGROUND OF THE INVENTION

With the freezing of the Long Term Evolution (LTE) project of the Universal Mobile Telecommunications System (UMTS) technique initiated by the 3GPP, the 3GPP organizations has begun studying the fourth generation (4G) mobile telecommunications system, e.g., the LTE-Advanced (LTE-A). In order to meet the requirement of high data rate of the 4G system (1 Gbps for downlink and 500 Mbps for uplink) required by the ITU, the 3GPP proposes a carrier aggregation technique in the LTE-A to support a bandwidth capable of providing the high data rate. The carrier aggregation technique can aggregate a plurality of carriers of different frequency ranges to form a maximum bandwidth of 100 M, so that the User Equipment (UE, also referred to as mobile terminal, mobile station, etc.) of the LTE-A can receive and/or transmit data on the plurality of carriers, thereby the bandwidth for transmitting or receiving data is more than 20 M. In the carrier aggregation technique, each aggregated carrier is called as a Component Carrier (CC).

In the carrier aggregation system, the base station (Evolved NodeB, eNB) end is provided with a plurality of CCs, and the UE also supports transmitting and receiving data on the plurality of CCs simultaneously. Currently, the study of the carrier aggregation technique by the 3GPP is in a slow progress, and particularly in the study of the high layer technique, only some concepts and basic flows are defined, while the technical details are not studied. Since the carrier aggregation technique is mainly used to provide a support of higher rate to the UE, there is no effect on the UE in an idle state. On this basis, it is agreed in the industry that for the UE in an idle state, only one of the CCs is available, and the service connection is set up through that CC. For the convenience of description, such CC is referred to as a primary carrier in the present invention, while other CCs in the same carrier aggregation system are referred to as additional carriers.

In the carrier aggregation technique, the signaling and control channel supporting multi-carrier transmission shall be re-designed in the physical layer, and a high layer protocol shall also be designed for management of the multiple carriers, including configuration of a carrier set of the UE, and addition, removal, etc. of carriers in the carrier set. Currently, the following two basic solutions are being discussed for the carrier management.

Solution 1: a solution based on one step, i.e., there is only a carrier configuration process. Specifically, one or more additional carriers are configured for the UE through a high layer signaling. After the configuration, the UE can receive control information and data on the configured carrier(s).

Solution 2: a solution based on two steps, i.e., a configuration process and an activation process. Specifically, firstly one or more additional carriers are configured for the UE through a high layer signaling. After the configuration, the UE cannot immediately receive control information or data on the configured carrier(s). Instead, when the downlink traffic volume of the UE is increased, the base station activates the configured one or more carriers through further signaling. Only after the carrier(s) being activated can the UE receive control information and data thereon. When the downlink traffic volume of the UE is decreased, the base station can deactivate the one or more carriers through a high layer signaling.

Compared with Solution 1, Solution 2 requires additional activation and deactivation signaling. In Solution 2, the additional carrier(s) can be activated and deactivated upon the traffic volume demand from the UE, so as to better save the UE power. But the above two solutions are still being discussed, and there is no concrete implementation process. Therefore, a concrete implementation solution for performing a carrier management shall be proposed for the carrier aggregation system.

To be noted, the above conventional techniques are just illustrated for the convenience of clearly and completely describing the technical solution of the present invention, and facilitating the appreciation by a person skilled in the art. It shall not be deemed that those solutions are known to a person skilled in the art just because they are illustrated in the Background of the Invention.

Some relevant literatures cited in the present invention are listed as follows, and incorporated herein by reference, as if they were detailedly described in the Specification.

1. US patent application with a publication No. US 20090268831A1;
2. US patent application with a publication No. US 20090257517A1;
3. US patent application with a publication No. US 20090219910A1;
4. International patent application with an international publication No. WO 2009120123A1;
5. Chinese patent application with a publication No. CN101465720.

SUMMARY OF THE INVENTION

An object of the present invention is to provide a method and an apparatus for performing a carrier management in a carrier aggregation system, so as to manage a plurality of carriers provided in the carrier aggregation system.

According to an aspect of the present invention, the present invention provides a method for performing a carrier management in a carrier aggregation system, comprising the steps of: transmitting a signaling that carries an additional carrier measurement indication to a user equipment (UE); receiving an additional carrier measurement report from the UE; and when the downlink traffic volume of the UE is increased, performing an additional carrier configuration operation for the UE according to the additional carrier measurement report in case carriers in a recorded current downlink carrier set of the UE do not meet the requirement of a data rate of the downlink traffic volume, and transmitting a signaling that carries a configuration indication to the UE to indicate the UE to perform corresponding configuration operation, the additional carrier configuration operation comprising configuring and activating at least one additional carrier, and adding the at least one additional carrier to the downlink carrier set.

In addition, at the base station side, operations of activation and deactivation of the additional carrier may be performed for the UE according to the change of the downlink traffic volume of the UE, operations of replacement and removal of a component carrier may be performed for the UE according to the measurement result of the component carrier in the carrier set reported by the UE, and the UE may be notified through a high layer signaling (e.g., RRC signaling, MAC signaling), a physical layer signaling (e.g., PDCCH signaling) or an implicit signaling.

In a preferred embodiment of the present invention, the method further comprising: when the downlink traffic volume of the UE is decreased, performing a deactivation operation on at least one activated additional carrier for the UE according to the downlink traffic volume of the UE, and indicating the UE to perform corresponding deactivation operation.

In another preferred embodiment of the present invention, the method further comprising: when the downlink traffic volume of the UE is increased, performing an activation operation on at least one deactivated additional carrier in the downlink carrier set for the UE in case the carriers in the recorded current downlink carrier set of the UE meet the requirement of a bandwidth of the downlink traffic volume, and transmitting a signaling that carries an activation indication to the UE to indicate the UE to perform corresponding activation operation.

In another preferred embodiment of the present invention, the method further comprising: transmitting a signaling that carries a monitoring indication to the UE to indicate the UE whether or not to monitor a Physical Downlink Control Channel (PDCCH) of at least one activated additional carrier in the downlink carrier set.

In another preferred embodiment of the present invention, the method further comprising: during a service connection of the UE, when it is determined according to the measurement report that an additional carrier of better signal quality is existed beyond the downlink carrier set, replacing an additional carrier of worst signal quality in the downlink carrier set with the additional carrier of better signal quality beyond the downlink carrier set, and transmitting a signaling that carries a replacement indication to the UE to indicate the UE to perform corresponding replacement, wherein the additional carrier of better signal quality refers to an additional carrier having a signal quality better than the signal quality of at least one additional carrier in the downlink carrier set.

In another preferred embodiment of the present invention, the method further comprising: during a service connection of the UE, when it is determined that an additional carrier having a signal quality strength lower than a predetermined threshold is existed in the downlink carrier set, removing the additional carrier having the signal quality strength lower than the predetermined threshold from the downlink carrier set, and transmitting a signaling that carries a removal indication to the UE to indicate the UE to perform corresponding removal operation.

According to another aspect of the present invention, the present invention further provides a method for performing a carrier management in a carrier aggregation system, comprising the steps of: when the downlink traffic volume is increased, performing an additional carrier configuration operation according to a signaling that carries a configuration indication from a base station, the additional carrier configuration operation comprising configuring and activating at least one additional carrier, and adding the at least one additional carrier to a downlink carrier set of user equipment (UE); and when the downlink traffic volume is decreased, performing a deactivation operation on at least one activated additional carrier in the downlink carrier set in case a deactivation indication for the at least one additional carrier in the downlink carrier set is received from the base station, or control information or data is not received on the at least one additional carrier in the downlink carrier set during a predetermined number of discontinuous reception cycles in succession.

In an embodiment of the present invention, the method further comprising: receiving a Media Access Control (MAC) signaling from the base station, and determining whether or not to activate an additional carrier or monitor a PDCCH of an activated additional carrier, according to bit information in the MAC signaling corresponding to the carrier in the downlink carrier set.

In an embodiment of the present invention, the method further comprising: during a service connection of the UE, when an additional carrier of better signal quality is existed beyond the downlink carrier set, receiving a signaling that carries a replacement indication from the base station, replacing an additional carrier of worst signal quality in the downlink carrier set with the additional carrier of better signal quality beyond the downlink carrier set according to the signaling that carries the replacement indication, wherein the additional carrier of better signal quality refers to an additional carrier having a signal quality better than the signal quality of at least one additional carrier in the downlink carrier set.

In an embodiment of the present invention, the method further comprising: during a service connection of the UE, when an additional carrier having a signal quality strength lower than a predetermined threshold is existed in the downlink carrier set, receiving a signaling that carries a removal indication from the base station, and removing the additional carrier having the signal quality strength lower than the predetermined threshold from the downlink carrier set according to the signaling that carries the removal indication.

According to another aspect of the present invention, the present invention further provides an apparatus for performing a carrier management in a carrier aggregation system, comprising: a measurement indication signaling generation unit configured to generate a signaling that carries an additional carrier measurement indication; a traffic volume detection unit configured to detect a downlink traffic volume of a user equipment (UE); a receiving unit configured to receive an additional carrier measurement report from the UE; a configuration unit configured to perform an additional carrier configuration operation for the UE according to the additional carrier measurement report received by the receiving unit when the traffic volume detection unit detects that an increase of the downlink traffic volume of the UE makes carriers in a recorded current downlink carrier set of the UE do not meet the requirement of a data rate of the downlink traffic volume, the additional carrier configuration operation comprising configuring and activating at least one additional carrier, and adding the at least one additional carrier to the downlink carrier set; a configuration indication signaling generation unit configured to generate a signaling that carries a configuration indication to indicate the UE to perform corresponding configuration operation; and a transmitting unit configured to transmit the signaling that carries the additional carrier measurement indication and the signaling that carries the configuration indication.

In a preferred embodiment of the present invention, the apparatus further comprising: a deactivation processing unit configured to perform a deactivation operation on at least one activated additional carrier for the UE according to the downlink traffic volume of the UE when the downlink traffic volume of the UE is decreased.

In another preferred embodiment of the present invention, the apparatus further comprising: an activation processing unit configured to, when the downlink traffic volume of the UE is increased, perform an activation operation on at least one deactivated additional carrier in the downlink carrier set for the UE in case the carriers in the recorded current downlink carrier set of the UE meet the requirement of a bandwidth of the downlink traffic volume; and an activation indication signaling generation unit configured to generate a signaling that carries an activation indication, wherein the transmitting unit is further configured to transmit the signaling that carries the activation indication to the UE to indicate the UE to perform corresponding activation operation.

In another preferred embodiment of the present invention, the apparatus further comprising: a monitoring indication signaling generation unit configured to generate a signaling that carries a monitoring indication; the transmitting unit is further configured to transmit the signaling that carries the monitoring indication to the UE to indicate the UE whether or not to monitor a PDCCH of at least one activated additional carrier in the downlink carrier set.

In another preferred embodiment of the present invention, the apparatus further comprising: a carrier replacement unit configured to replace, during a service connection of the UE, an additional carrier of worst signal quality in the downlink carrier set with an additional carrier of better signal quality beyond the downlink carrier set when it is determined according to the measurement report that the additional carrier of better signal quality is existed beyond the downlink carrier set, wherein the additional carrier of better signal quality refers to an additional carrier having a signal quality better than the signal quality of at least one additional carrier in the downlink carrier set; and a replacement indication signaling generation unit configured to generate a signaling that carries a replacement indication; the transmitting unit is further configured to transmit the signaling that carries the replacement indication to the UE to indicate the UE to perform corresponding replacement.

In another preferred embodiment of the present invention, the apparatus further comprising: a removal processing unit configured to, during a service connection of the UE, remove an additional carrier having a signal quality strength lower than a predetermined threshold from the downlink carrier set, when it is determined that the additional carrier having the signal quality strength lower than the predetermined threshold is existed in the downlink carrier set; and a removal indication signaling generation unit configured to generate a signaling that carries a removal indication; the transmitting unit is further configured to transmit the signaling that carries the removal indication to the UE to indicate the UE to perform corresponding removal operation.

According to another aspect of the present invention, the present invention further provides an apparatus for performing a carrier management in a carrier aggregation system, comprising: a configuration processing unit configured to, when the downlink traffic volume is increased, perform an additional carrier configuration operation according to a signaling that carries a configuration indication from a base station, the additional carrier configuration operation comprising configuring and activating at least one additional carrier, and adding the at least one additional carrier to the downlink carrier set; and a deactivation processing unit configured to, when the downlink traffic volume is decreased, perform a deactivation operation on at least one activated additional carrier in the downlink carrier set in case a deactivation indication for the at the least one additional carrier in the downlink carrier set is received from the base station, or control information or data is not received on the at least one additional carrier in the downlink carrier set during a predetermined number of discontinuous reception cycles in succession.

In a preferred embodiment of the present invention, the apparatus further comprising: a receiving unit configured to receive a Media Access Control (MAC) signaling from the base station; and an activation or monitoring processing unit configured to determine whether or not to activate an additional carrier or monitor a PDCCH of an activated additional carrier, according to bit information in the MAC signaling corresponding to the carrier in the downlink carrier set.

In another preferred embodiment of the present invention, the apparatus further comprising: a receiving unit configured to receive a signaling that carries a replacement indication from the base station when an additional carrier of better signal quality is existed beyond the downlink carrier set; and a replacement processing unit configured to replace an additional carrier of worst signal quality in the downlink carrier set with the additional carrier of better signal quality beyond the downlink carrier set according to the signaling that carries the replacement indication, wherein the additional carrier of better signal quality refers to an additional carrier having a signal quality better than the signal quality of at least one additional carrier in the downlink carrier set.

In another preferred embodiment of the present invention, the apparatus further comprising: a receiving unit configured to receive a signaling that carries a removal indication from the base station, when an additional carrier having a signal quality strength lower than a predetermined threshold is existed in the downlink carrier set; and a removal processing unit configured to remove the additional carrier having the signal quality strength lower than the predetermined threshold from the downlink carrier set according to the signaling that carries the removal indication.

According to another aspect of the present invention, the present invention further provides a computer readable program, which enables, when being executed in a carrier aggregation system, a computer to execute the aforementioned method for performing a carrier management in a carrier aggregation system.

According to another aspect of the present invention, the present invention further provides a storage medium that stores a computer readable program, wherein the computer readable program enables a computer to execute the aforementioned method for performing a carrier management in a carrier aggregation system.

Based on the method and apparatus for performing a carrier management in a carrier aggregation system, the additional carrier can be effectively managed according to the traffic volume demand of the UE.

In order to achieve the aforementioned and relevant objects, the present invention includes the features sufficiently described later and specifically pointed out in the claims. The following descriptions and drawings illustrate the specific exemplary embodiments of the present invention in detail. However, these embodiments only illustrate several ways for using the principle of the present invention. Other objects, advantages and novel features will be apparent in accordance with the following detailed descriptions of the present invention in conjunction with the drawings.

BRIEF DESCRIPTION OF THE DRAWINGS

The accompanied drawings illustrate the preferred embodiments of the present invention and constitute a portion of the Specification, for further explaining the principle of the present invention in details together with the textual descriptions, in which.

DETAILED DESCRIPTION OF THE PREFERRED EMBODIMENTS

The technical solutions in the embodiments of the present invention will be described clearly and completely as follows in conjunction with the drawings in the embodiments. Obviously, the described embodiments are just a part of embodiments of the present invention rather than all the embodiments. All other embodiments obtained by a person skilled in the art based on the embodiments of the present invention without paying any creative effort fall within the protection scope of the present invention.

To be noted, in order to avoid the present invention from being vague due to unnecessary details, the drawings only illustrate device structure and/or processing step closely associated with the solution according to the present invention, and other details not so related with the present invention are omitted.

The present invention proposes a new method for performing a carrier management in a carrier aggregation system, based on the currently discussed two-step solution (configuration and activation). Now the method of the present invention will be detailedly described as follows through the embodiments.

Before starting the data transmission, the UE shall set up a service connection and activate a security mode. Thus, in order that the present invention can be better understood, a signaling flow for a UE to set up a service connection and a signaling flow for the UE to activate a security mode in a LTE system are described firstly.

Figure 1:
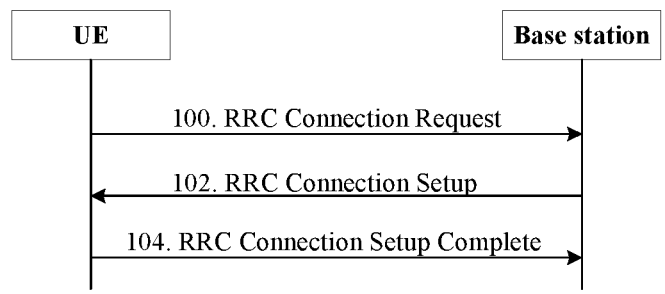
FIG. 1 illustrates a signaling flow for a UE to set up a service connection in a LTE system.

As illustrated in FIG. 1, a flow for a UE to set up a service connection in a LTE system comprises:

Step 100: the UE transmits a Radio Resource Control (RRC) connection request to a base station.

In case the UE is in an idle state, after a Non Access Stratum (NAS) triggers a service connection request, the UE transmits a RRC Connection Control signaling to the base station to require the base station to set up a service connection for the UE.

Step 102: the base station returns a RRC Connection Setup signaling to the UE.

Specifically, after receiving a RRC Connection Request signaling from the UE, the base station configures dedicated radio resources for the UE, and notifies the UE of resource configuration information through the RRC Connection Setup signaling.

Step 104: after the radio resource configuration is completed, the UE returns a RRC Connection Setup Complete signaling to the base station.

Specifically, after receiving the RRC Connection Setup signaling from the base station, the UE configures the radio resources while stopping several timers used in idle states. Next, information of registered Mobile Management Entity (MME) is transmitted to the base station through the RRC Connection Setup Complete signaling, thereby completing the connection setup process.

Figure 2:
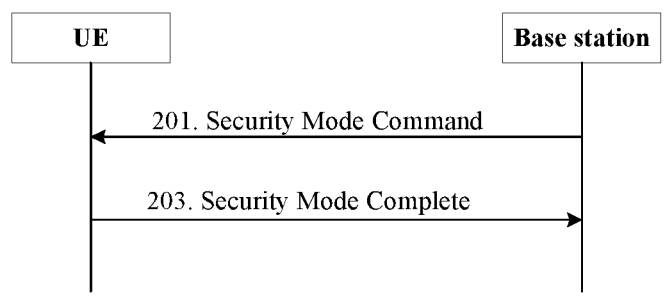
FIG. 2 illustrates a signaling flow for a UE to activate a security mode in a LTE system.

As illustrated in FIG. 2, a flow for a UE to activate a security mode comprises:

Step 201: after a service connection is set up for the UE, a base station transmits a Security Mode Command signaling to the UE.

Step 203: after receiving the Security Mode Command signaling, the UE calculates an encryption key and performs an encryption algorithm. Then, the UE transmits a Security Mode Complete signaling to the base station, thereby completing the activation of the security mode.

In the LTE-A system, the UE searches a carrier during the cell searching process and residues thereon to enter an idle state. For the UE, the resident carrier is the primary carrier of the UE. When the NAS triggers a service connection request, the UE performs a service connection (see FIG. 1) and a security mode activation (see FIG. 2) through the primary carrier according to the signaling flows designed in the LTE system, and then enters a service connected state and starts data transmission and reception.

The present invention performs a carrier management for the UE having completed the service connection and the security mode activation, including configuring additional carriers for the UE. In order to realize the carrier management for the UE, a downlink carrier set is recorded at the base station side and the UE, respectively. The downlink carrier set comprises the information of carriers (including primary and additional carriers) configured for the UE. Before an additional carrier configuration is made for the UE, the downlink carrier set only contains the information of primary carrier.

Figure 3:
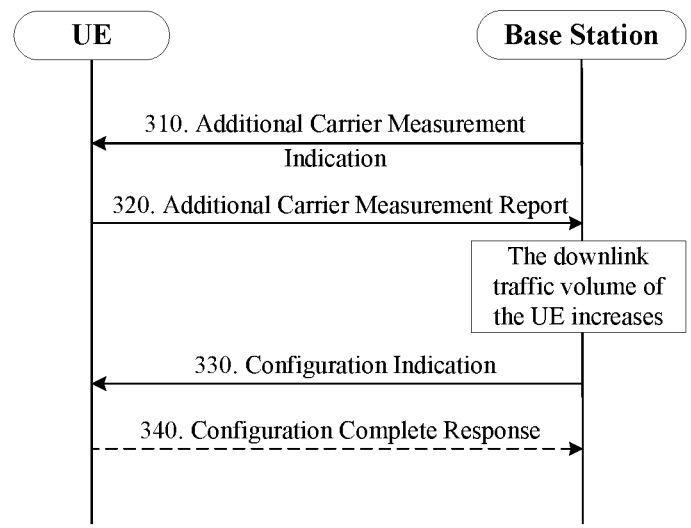
FIG. 3 illustrates a flowchart of configurating an additional carrier in an embodiment of the present invention.

FIG. 3 illustrates a flowchart of a method for performing a carrier management in a carrier aggregation system according to an embodiment of the present invention. As illustrated in FIG. 3, the method comprising:

Step 310: the base station transmits a signaling that carries an additional carrier measurement indication to the UE.

In a preferred embodiment of the present invention, the signaling that carries the additional carrier measurement indication is a RRC signaling, such as a RRC Connection Reconfiguration signaling. But the present invention is not limited thereto, and the signaling may be other RRC or non-RRC signaling.

The information carried by the signaling (herein referred to as additional carrier measurement indication) for example may include, but not limited to, frequency and bandwidth of the additional carrier to be measured, measuring interval, and reporting cycle of the measurement result.

The primary carrier is always in an activated state during the service connection of the UE. After receiving the signaling that carries the additional carrier measurement indication from the base station, the UE perform a measurement of signal quality, etc. of the additional carrier in the carrier aggregation system according to the information in the signaling, and cyclically reports the measurement result through a measurement report.

Step 320: the base station receives an additional carrier measurement report from the UE.

The additional carrier measurement report carries the measurement result of the additional carrier measured by the UE. In a preferred embodiment of the present invention, the additional carrier measurement report is a RRC signaling, such as a RRC Connection Reconfiguration Complete signaling. But the present invention is not limited thereto, and the signaling may be other RRC or non-RRC signaling. The base station can acquire the signal quality of the additional carrier according to the measurement result.

Step 330: when the downlink traffic volume of the UE is increased, the base station performs an additional carrier configuration operation for the UE, and transmits a signaling that carries a configuration indication to the UE to indicate the UE to perform corresponding configuration operation.

Wherein, the additional carrier configuration operation comprising configuring and activating at least one additional carrier, and adding the at least one additional carrier to the downlink carrier set.

Specifically, when the downlink traffic volume of the UE is increased, the base station may configure and activate one or more additional carriers for the UE according to the signal quality of the additional carriers in the additional carrier measurement report from the UE, in case carriers in a downlink carrier set configured for the UE by the base station cannot meet the requirement of a data rate of the downlink traffic volume, and adds the configured additional carrier(s) to the downlink carrier set. In addition, the base station further transmits an additional carrier configuration indication to the UE through a specific signaling, which may be a RRC signaling, such as a RRC Connection Reconfiguration signaling. But the present invention is not limited thereto, and the specific signaling may be other RRC or non-RRC signaling. The information (i.e., the additional carrier configuration indication) contained in the specific signaling may include, but not limited to, frequency, bandwidth, dedicated radio resource allocation information, etc. for the configured downlink carrier.

In correspondence with step 330, after receiving the specific signaling, the UE finds that an additional carrier is newly configured for it by the base station, then it configures the additional carrier according to information in the signaling (e.g., configuring dedicated radio resource information for the additional carrier) and activates the additional carrier, thereby starting to receive, on the newly configured additional carrier, control information from a Physical Downlink Control Channel (PDCCH) and data from a Physical Downlink Shared Channel (PDSCH). The UE also adds the newly configured additional carrier to the downlink carrier set.

After the UE completes the configuration of the additional carrier, optionally, the method may comprise step 340 in which the UE returns a configuration complete response signaling to the base station. The configuration complete response signaling is preferably a RRC signaling such as a RRC Connection Reconfiguration Complete signaling, but it is not limited thereto and may be a signaling of other form.

The configuration (including activation) of the additional carrier for the UE is completed based on the above steps 310 to 340. The embodiment of the present invention performs an initial configuration of the additional carrier according to the downlink traffic volume. The additional carrier is activated while the additional carrier is initially configurated.

In addition, the present invention may also perform deactivation and activation operations on the additional carrier for the UE at the base station side according to the change of the downlink traffic volume of the UE, perform replacement and removal operations on component carriers for the UE according to a measurement result of the component carriers in the carrier set reported by the UE, and notify the UE through a high layer signaling (e.g., RRC signaling, MAC signaling, etc.), a physical layer signaling (e.g., PDCCH signaling) or an implicit signaling.

Figure 4:
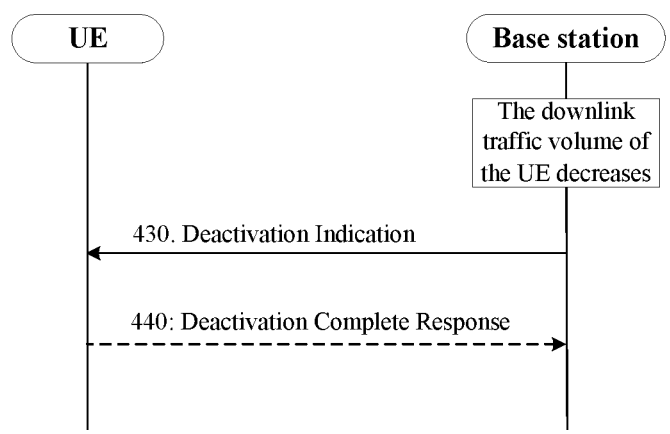
FIG. 4 illustrates a flowchart of a deactivation operation on an additional carrier in another embodiment of the present invention.

When the downlink traffic volume of the UE is decreased, as illustrated in FIG. 4, the method for performing a carrier management according to the present invention may further comprise the following step of additional carrier deactivation:

Step 430: the base station deactivates at least one additional carrier for the UE according to the downlink traffic volume of the UE and transmits a deactivation indication to the UE, so as to indicate the UE to perform corresponding deactivation operation on the at least one additional carrier.

The base station may transmit the deactivation indication to the UE through an explicit signaling, so as to notify the UE to deactivate one or more additional carriers in an activated state. The explicit signaling may be a RRC signaling, such as a RRC Connection Reconfiguration signaling, but it is not limited thereto and may be other RRC or non-RRC signaling. The indication (i.e., deactivation indication) carried in the explicit signaling may include, but not limited to, frequency of the deactivated additional carrier, and it may further include information such as bandwidth of the deactivated additional carrier. After receiving the explicit signaling, the UE judges to perform corresponding deactivation operation on the additional carrier according to the operation defined by the explicit signaling and the additional carrier information carried therein.

After the UE deactivates at least one activated additional carrier, optionally, the method may further comprise step 440 in which a deactivation complete response signaling is returned to the base station. The deactivation complete response signaling is preferably a RRC signaling such as a RRC Connection Reconfiguration Complete signaling, but it is not limited thereto and may be a signaling of other form.

The above deactivating steps 430 and 440 of additional carrier as illustrated in FIG. 4 are performed through the explicit signaling. In order to save the air-interface resources, in another preferred embodiment of the present invention, the base station may notify the UE to deactivate one or more additional carriers in an activated state through an implicit singling when the downlink traffic volume of the UE is decreased.

The design method for the implicit singling is that the base station and the UE provide the same timer. The minimum timing unit of the timer is a Discontinuous Reception (DRX) cycle, which is configured by the base station when the UE sets up a service connection. When the base station does not transmit any control information or data for the UE on the PDCCH or PDSCH of the additional carrier in successive X DRX cycles, it sets the additional carrier in a deactivated state, and deletes corresponding timer, wherein X for example is, but not limited to, an integer larger than 1. Similarly, when the UE does not receive any control information or data on the additional carrier in successive X DRX cycles, it deactivates the additional carrier and deletes corresponding timer. Since the timer is synchronous at the base station side and the UE side, the additional carrier is synchronously deactivated by the base station and the UE. When an additional carrier in the downlink carrier set is in the deactivated state, the base station and the UE will stop transmitting and receiving the control information and data on the deactivated additional carrier, respectively. Using an implicit signaling to perform the deactivation operation on the additional carrier can save the air-interface resources.

Figure 5:
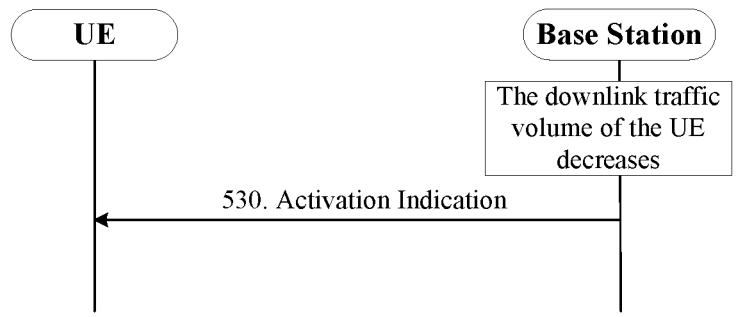
FIG. 5 illustrates a flowchart of an activation operation on an additional carrier in another embodiment of the present invention.

Further, when the downlink traffic volume of the UE is increased again, in case the carriers in the downlink carrier set currently configured by the base station can meet the requirement of the data rate of the downlink traffic volume, while the currently activated carriers do not meet the requirement of the data rate of the downlink traffic volume, the method for performing a carrier management according to the present invention may further comprise the following step of activating additional carrier(s), as illustrated in FIG. 5:

Step 530: the base station performs an activation operation on at least one deactivated additional carrier in the downlink carrier set for the UE, and transmits a signaling that carries an activation indication to the UE to indicate the UE to perform corresponding activation operation.

In one embodiment of the present invention, the signaling that carries the activation indication is preferably a Media Access Control (MAC) signaling. For example, the base station selects, according to the measurement result of the additional carriers reported by the UE, one or more deactivated additional carriers for the UE from the downlink carrier set to activate the one or more deactivated additional carriers, and notifies the UE to activate the one or more deactivated additional carriers through the MAC signaling.

The design method for the MAC signaling is to add information of predetermined byte(s) (e.g., one or more bytes) to a MAC Protocol Data Unit (PDU) of the LTE system. Such byte(s) include(s) reserved bits and available bits, wherein the number of the available bits is equal to that of the carriers in the downlink carrier set, and the rest bits are the reserved bits. The available bits are one-by-one corresponding to the carriers in the downlink carrier set through bit mapping. In which, the meaning of a predetermined value (1 or 0) of an available bit corresponding to the primary carrier is the same as that of a DRX command in the LTE system, both for controlling the activated carriers in the downlink carrier set. For example, when the value of the available bit corresponding to the primary carrier is 1, the UE is indicated to perform an operation the same as that carried out after the DRX command is received in the LTE system. When the value of the available bit corresponding to the primary carrier is 0, corresponding to the case that no DRX command exists, the UE is indicated to perform an operation the same as that carried out in case no DRX command is received in the LTE system, vice versa. The available bit corresponding to the additional carrier is used to notify the UE whether the corresponding additional carrier shall be activated. For example, when the available bit corresponding to the deactivated additional carrier is set to be a first value, it is indicated to activate the deactivated additional carrier; and when the available bit corresponding to the deactivated additional carrier is set to be a second value, it is indicated not to activate the deactivated additional carrier. After receiving the MAC signaling, the UE activates a deactivated additional carrier in case the MAC signaling indicates to activate the deactivated additional carrier, and starts to receive control information from the PDCCH and data from the PDSCH on the activated additional carrier.

Since the current LTE-A can support using one carrier to schedule another carrier, i.e., to transmit resource scheduling information for the another carrier through the PDCCH of the one carrier, the base station may transmit a signaling that carries a monitoring indication to the UE in another embodiment of the present invention, so as to indicate the UE whether or not to monitor the PDCCH of at least one activated additional carrier in the downlink carrier set.

In which, the signaling that carries the monitoring indication is preferably a MAC signaling having the same structure as the signaling that carries the activation indication. In that case, the available bit corresponding to the additional carrier is used to notify the UE whether or not to monitor the PDCCH of the additional carrier corresponding to the available bit.

For example, the base station may indicate the UE whether or not to monitor the PDCCH of the additional carrier through the MAC signaling. In case the MAC signaling indicates, through the available bit of a predetermined value (e.g., 1), an activated additional carrier with its PDCCH being monitored, the UE stops receiving control information on the PDCCH of the additional carrier, and only receives data on the PDSCH, so as to reduce the complexity of blind detection performed by the UE to decode the PDCCH.

On the contrary, in case the MAC signaling indicates, through the available bit of the predetermined value (e.g., 1), an activated additional carrier with its PDCCH not monitored, the UE starts to monitor the PDCCH of the additional carrier, so as to receive control information on the additional carrier.

The above described MAC signaling is just an example. In other embodiments of the present invention, the signaling that carries the activation indication and the signaling that carries the monitoring indication may also be a PDCCH signaling that carries activation indication information and a PDCCH signaling that carries monitoring indication information, respectively.

Figure 6:
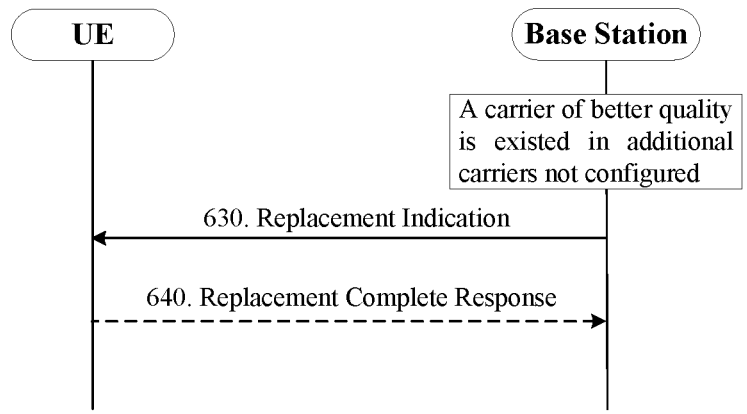
FIG. 6 illustrates a flowchart of a replacement operation on an additional carrier in another embodiment of the present invention.

Further, during the service connection of the UE, in case it is determined according to the measurement report of the UE that a certain additional carrier not configured for the UE has a better signal quality than a certain additional carrier in the downlink carrier set, i.e., an additional carrier of better signal quality is existed beyond the downlink carrier set (the additional carrier of better signal quality refers to an additional carrier having a signal quality better than that of at least one additional carrier in the downlink carrier set), the method according to the present invention further comprises the following step of additional carrier replacement as illustrated in FIG. 6:

Step 630: the base station replaces the certain additional carrier (e.g., an additional carrier of worst signal quality) in the downlink carrier set with the additional carrier of better signal quality beyond the downlink carrier set through a specific signaling.

In which, the specific signaling may be a RRC signaling, such as a RRC Connection Reconfiguration signaling. But it is not limited thereto and may be other RRC or non-RRC signaling. The information contained in the RRC signaling (herein referred to as replacement indication) includes, but not limited to, frequency of the replaced additional carrier, frequency of the replacing additional carrier, and bandwidth and dedicated radio resource allocation information of the replacing additional carrier. The UE may update the information of the downlink carrier set after receiving the RRC signaling.

Further, in case the additional carrier in the downlink carrier set being replaced is in the activated state before being replaced, the specific signaling indicates the UE to configure and activate the additional carrier of better signal quality. In case the replaced additional carrier in the downlink carrier set being replaced is in the deactivated state before being replaced, the specific signaling indicates the UE to only configure the additional carrier of better signal quality and make the configured additional carrier in the deactivated state.

After the UE completes the replacement operation on the additional carrier, optionally, a replacement complete indication signaling may be returned to the base station. The replacement complete indication signaling may be, but not limited to, a RRC signaling such as a RRC Connection Reconfiguration Complete signaling.

Figure 7:
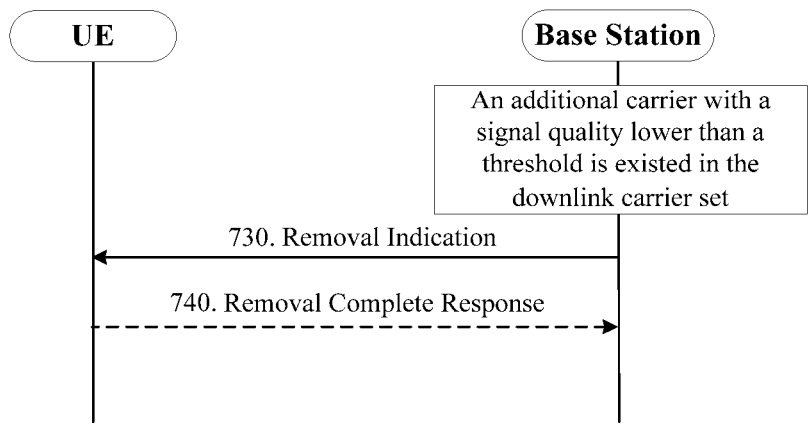
FIG. 7 illustrates a flowchart of removal operation on an additional carrier in another embodiment of the present invention.

In addition, optionally as illustrated in FIG. 7, the method for performing a carrier management according to the present invention may also comprise the following steps:

During the service connection of the UE, when it is determined that an additional carrier having a signal quality strength lower than a predetermined threshold is existed in the downlink carrier set, the base station removes the additional carrier having the signal quality strength lower than the predetermined threshold from the downlink carrier set, and transmits a signaling that carries a removal indication to the UE to indicate the UE to perform corresponding removal operation. In which the step of determining that an additional carrier having a signal quality strength lower than a predetermined threshold is existed in the downlink carrier set may comprise: determining that an additional carrier having a signal quality strength lower than a predetermined threshold is existed in the downlink carrier set according to the measurement report from the UE, or according to a fact that the measurement report from the UE cannot be received normally when the UE moves out of the coverage range of additional carrier 1. The signaling that carries the removal indication may be a RRC signaling, such as a RRC Connection Reconfiguration signaling, but it is not limited thereto and may be other RRC or non-RRC signaling.

The information contained in the RRC signaling (i.e., removal indication) includes, but not limited to, frequency of the removed additional carrier. After receiving the RRC signaling, the UE updates the information of the downlink carrier set. Optionally, after the corresponding additional carrier is removed, a removal complete response signaling may be returned to the UE. The removal complete response signaling may be, but not limited to, a RRC signaling, such as a RRC Connection Reconfiguration Complete signaling.

In light of the above method for performing a carrier management, processes of configuration, activation, deactivation and reconfiguration (including replacement and removal) of the additional carrier may be performed at the base station side according to the measurement result of the additional carrier and the change of the downlink traffic volume of the UE. At the UE side, according to the downlink signaling (including implicit signaling), the signal reception quality over the additional carrier may be measured and the reception of control information on the PDCCH and data on the PDSCH of the additional carrier may be controlled.

In addition, the method for performing a carrier management according to the present invention may activate and deactivate the additional carrier upon the traffic volume demand from the UE, so as to better save the UE power.

The method for performing a carrier management according to the present invention will be detailedly described as follows in conjunction with concrete examples.

Figure 8A:
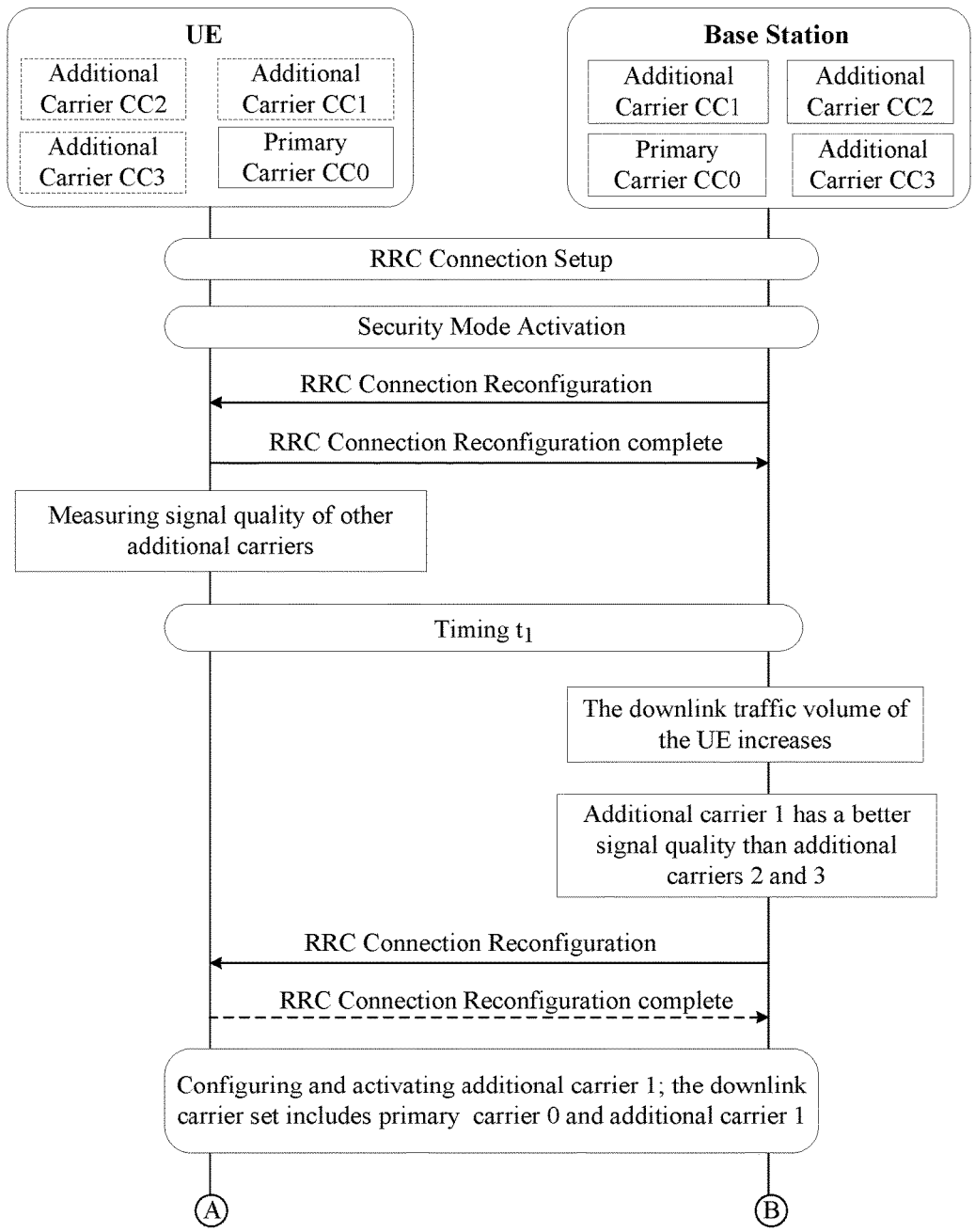
FIG. 8A illustrates a signaling flow of managing additional carriers in another embodiment of the present invention.
Figure 8B:
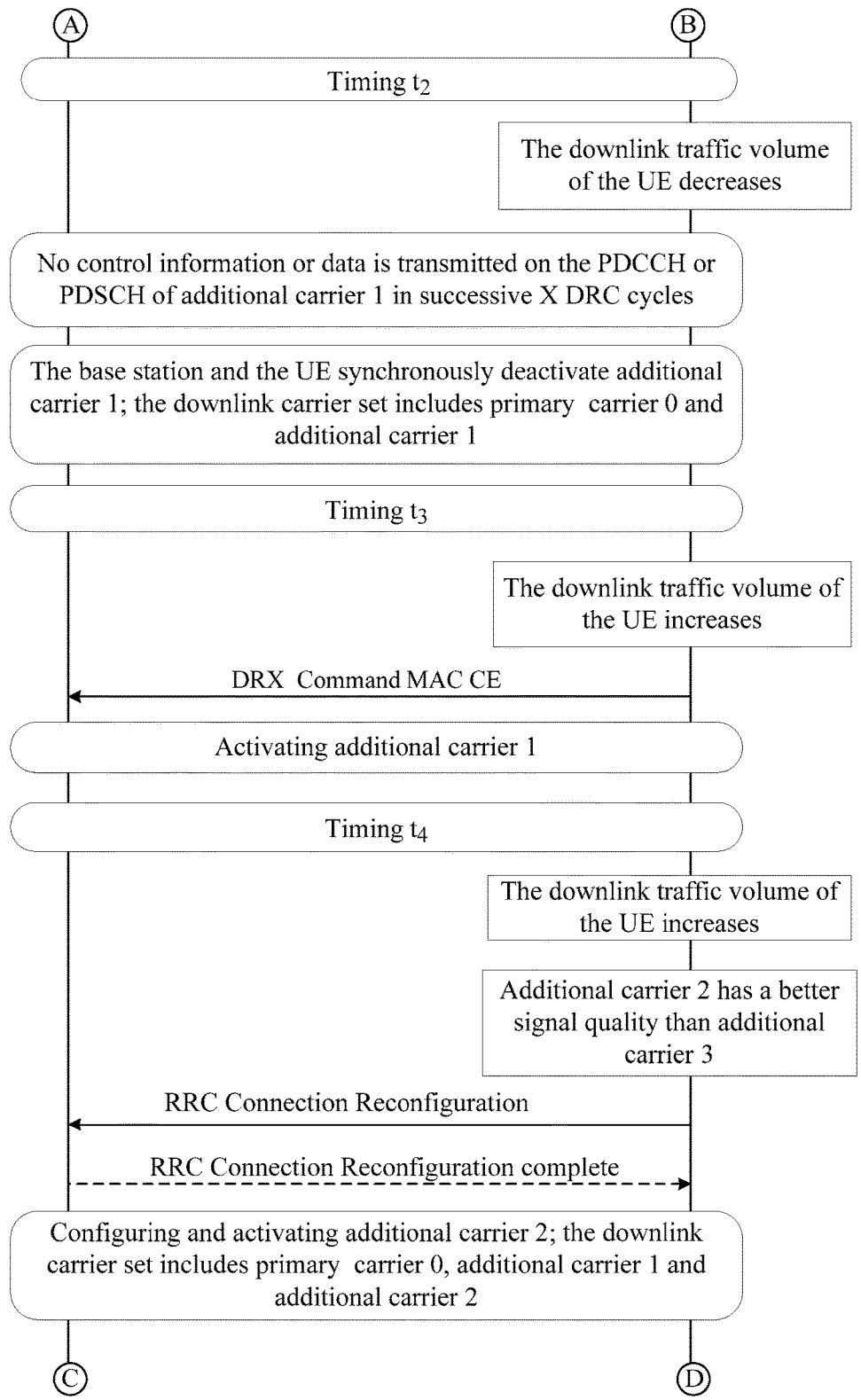
FIG. 8B illustrates a signaling flow of managing additional carriers in another embodiment of the present invention.
Figure 8C:
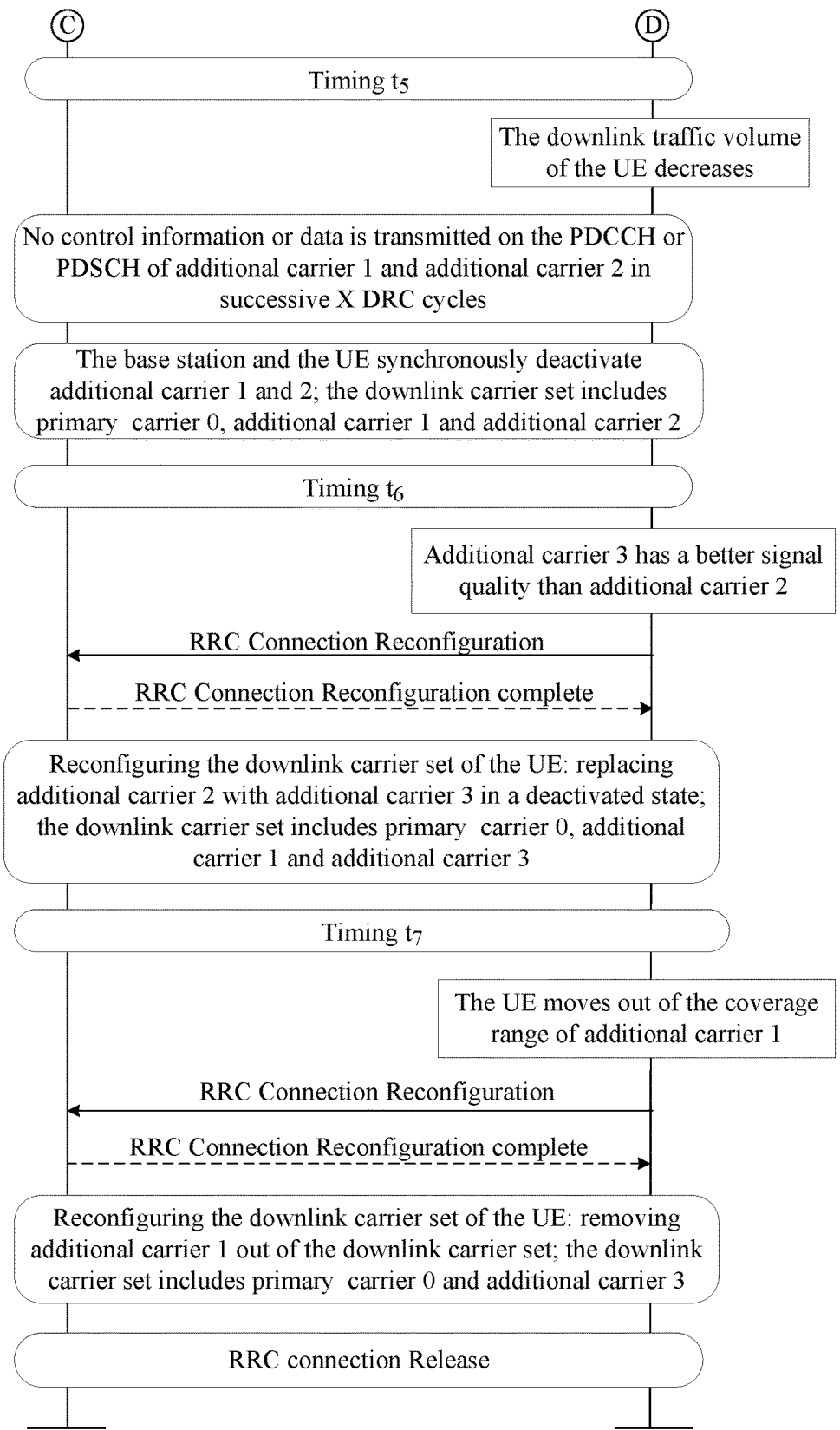
FIG. 8C illustrates a signaling flow of managing additional carriers in another embodiment of the present invention.

Assuming that the carrier aggregation system of the LTE-A is provided with four carriers (carriers 0 to 3), and the UE supports simultaneous data transmission and reception on at most three carriers. FIG. 8 illustrates an example of a carrier management flow according to an embodiment of the present invention.

After the UE sets up a service connection through primary carrier 0 and activates the security mode, the base station configures additional carrier measurement indication information for the UE, and notifies the UE of the additional carrier measurement indication information through a RRC Connection Reconfiguration signaling. The additional carrier measurement indication information may include: frequencies and bandwidths of additional carriers 1 to 3 to be measured, measuring intervals and measurement result reporting cycles for the three additional carriers, etc. After receiving such information, the UE measures the signal quality of the additional carriers through a transceiver of the primary carrier 0, and cyclically reports the measurement result to the base station through a RRC Connection Reconfiguration Complete signaling.

At the timing of $t_1$, when the downlink traffic volume of the UE is increased, the base station configures the UE with an additional carrier of optimal signal quality according to the measurement report for the additional carriers received from the UE, in case the primary carrier 0 does not meet the requirement of the data rate of the downlink traffic volume. In the embodiment, assuming that the additional carrier of optimal signal quality at this timing is additional carrier 1, the base station thus configures and activates additional carrier 1 for the UE, and indicates the UE to perform corresponding configuration operation on additional carrier 1 through a RRC Connection Reconfiguration signaling. The RRC Connection Reconfiguration signaling may include frequency, bandwidth of additional carrier 1 and dedicated radio resource configuration information, etc. Meanwhile, the base station will add additional carrier 1 to the downlink carrier set of the UE recorded by the base station, and then the downlink carrier set of the UE recorded by the base station includes primary carrier 0 and additional carrier 1. After receiving the RRC Connection Reconfiguration signaling, the UE finds that a new additional carrier is configured for it by the base station, and then it configures additional carrier 1 according to the information carried in the signaling and immediately activates additional carrier 1, thereby starting to receive control information and data on the PDCCH and PDSCH of additional carrier 1, respectively. In that case, optionally, the UE may return a response signaling, such as RRC Connection Reconfiguration Complete signaling, to the base station to indicate that the configuration operation is completed. The UE will also add additional carrier 1 to its downlink carrier set. At that time, the downlink carrier set recorded by the UE includes primary carrier 0 and additional carrier 1.

After additional carrier 1 is activated, both the base station and the UE set a timer 1 for additional carrier 1. In the activated duration of additional carrier 1, the base station restarts the timer every time the control information is transmitted on the PDCCH or data is transmitted on the PDSCH for the UE. Meanwhile, the UE restarts the timer every time the control information is received on the PDCCH or data is received on the PDSCH. At the timing of $t_2$, when the downlink traffic volume of the UE is decreased, the base station deactivates additional carrier 1 for the UE and deletes the corresponding timer, in case the base station does not transmit any control information or data on additional carrier 1 for the UE in successive X DRX cycles. Similarly, the UE deactivates additional carrier 1 and deletes the corresponding timer, in case the UE does not receive any control information or data on additional carrier 1 in successive X DRX cycles. Since the timer is synchronous at the base station side and the UE side, additional carrier 1 is synchronously deactivated by the base station and the UE.

Then, during the service connection process, the downlink carrier set of the UE includes two carriers, i.e., primary carrier 0 and additional carrier 1, while only primary carrier 0 is in the activated state. At the timing of $t_3$, when the downlink traffic volume of the UE is increased again, the base station may activate additional carrier 1 and notify the UE through a MAC signaling to also activate additional carrier 1, in case primary carrier 0 does not meet the requirement of the data rate. The MAC signaling is a MAC Protocol Data Unit (PDU). The format of the MAC PDU used for the LTE-A in the embodiment is described as follows with reference to the format of the MAC PDU in the LTE system.

Figure 9:
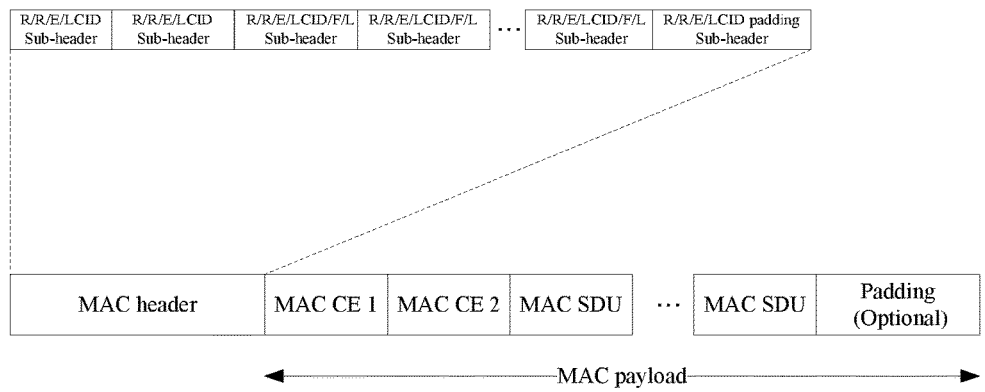
FIG. 9 illustrates a MAC PDU format in an LTE system.
Figure 10:
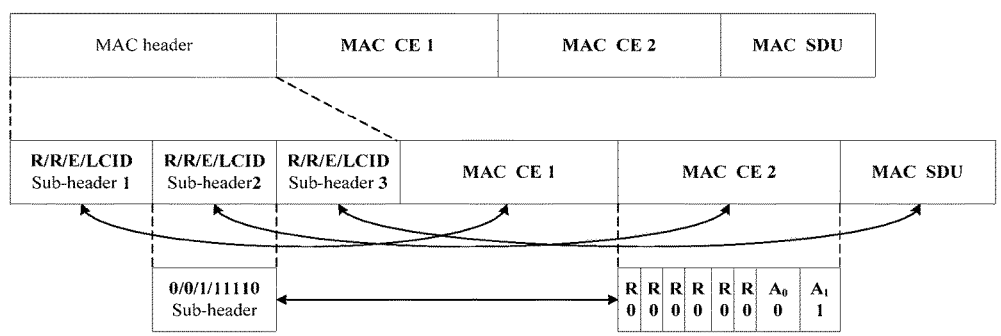
FIG. 10 illustrates a MAC PDU format in an embodiment of the present invention.

FIG. 9 illustrates a MAC PDU format in a LTE system. As illustrated in FIG. 9, the MAC PDU includes a MAC header and a MAC payload. In which, the MAC header includes a plurality of MAC sub-headers, the MAC payload includes a plurality of MAC Control Elements (CEs) and a plurality of MAC Service Data Units (SDUs), and each MAC sub-header is corresponding to one MAC CE or MAC SDU. When a sub-header valued as "11110" occurs in the MAC header, it means that a MAC CE corresponding to the sub-header is a DRX command MAC CE with a size of 0 bit. FIG. 10 illustrates an example of a MAC PDU in MAC signaling of a carrier aggregation system used for a LTE-A according to an embodiment of the present invention. The MAC PDU proposed in the present invention differs from that in the LTE system as follows: the MAC PDU of the present invention extends the length of the DRX command MAC CE into 1 byte. The 1 byte includes reserved bits (R) and available bits (A). The number of the available bits is equal to that of the carriers in the downlink carrier set of the UE, and the rest bits are the reserved bits. In the embodiment, the default value of the available bit is 0 (herein 0 is just an example, and 1 is also possible). For example the available bits from left to right are one-by-one corresponding to the carriers with frequency ranges from low to high in the downlink carrier set, respectively (herein the from low to high order of the frequency ranges is just an example, and the available bits from left to right may also be one-by-one corresponding to the carriers with frequency ranges from high to low in the downlink carrier set, respectively). Among the available bits, a predetermined value (e.g., 1) of the one corresponding to the primary carrier is used to indicate the DRX command, and an available bit corresponding to an additional carrier in the downlink carrier set is used to indicate whether or not to perform an activation operation on corresponding additional carrier. For example, when the value of the available bit corresponding to the primary carrier is set as 1, the meaning is the same as that of the DRX command MAC CE in the LTE system, and is adaptive to all activated carriers of the UE. The detailed meaning of the DRX command MAC CE may refer to 3GPP TS 36.321. In the embodiment, the downlink carrier set of the UE includes two carriers: primary carrier 0 and additional carrier 1. When further assuming that the frequency range of primary carrier 0 is lower than that of additional carrier 1, the contents of sub-header and DRX command MAC CE related to the carrier activation in the MAC PDU at the current timing are "11110" and "00000001", respectively. In which, the value "11110" of the sub-header means that a MAC CE corresponding to the sub-header is a DRX command MAC CE. In the DRX command MAC CE, the value of $A_1$ is 1, which means that the UE needs to activate additional carrier 1, and the value of $A_0$ is 0, which means that the UE does not need to perform, on the activated primary carrier 0 and additional carrier 1, an operation the same as that made in the LTE system after a DRX command MAC CE is received. After receiving the signaling that indicates to activate additional carrier 1, the UE activates carrier 1 and starts to receive control information and data on the PDCCH and PDSCH of additional carrier 1, respectively. After additional carrier 1 is activated, both the base station and the UE set a timer 1 for the additional carrier.

As LTE-A can support using one carrier to schedule another carrier, i.e., using the PDCCH of one carrier to transmit resource scheduling information for another carrier, when the UE activates additional carrier 1, the base station may notify the UE whether or not to continue monitoring the PDCCH of additional carrier 1, according to a Channel Quality Indication (CQI) of the UE on additional carrier 1. For example, in case the CQI of additional carrier 1 is poor, the base station may decide to schedule additional carrier 1 on primary carrier 0, i.e., to transmit resource scheduling information for additional carrier 1 through the PDCCH of primary carrier 0, instead of transmitting resource scheduling information on the PDCCH of additional carrier 1. In that case, the base station can also notify the UE whether or not to continue monitoring the PDCCH of additional carrier 1 through a MAC PDU as illustrated in FIG. 10. The difference is that when additional carrier 1 is in the activated state and the UE monitors the PDCCH on additional carrier 1, $A_1$ valued as 1 means that the UE does not need to monitor the PDCCH on additional carrier 1 subsequently during the period in which additional carrier 1 is activated. After receiving the MAC PDU, the UE stops the blind detection on the PDCCH of additional carrier 1, and only receives the data on the PDSCH of additional carrier 1. When additional carrier 1 is in the activated state and the UE does not monitor the PDCCH on additional carrier 1, $A_1$ valued as 1 means that the UE needs to monitor the PDCCH on additional carrier 1. After receiving the MAC PDU, the UE starts to monitor the PDCCH on additional carrier 1.

At the timing of $t_4$, when the traffic volume is increased again, the base station reselects and reconfigures an additional carrier of optimal signal quality for the UE according to the latest received measurement report of the UE, in case the activated primary carrier 0 and additional carrier 1 do not meet the requirement of data rate. In the embodiment, it is assumed that the optimal additional carrier at the timing is additional carrier 2. Next, like the aforementioned process of configuring and activating additional carrier 1, the base station configures and activates additional carrier 2 for the UE, and indicates the UE to perform corresponding operation (configuring and activating additional carrier 2) through a RRC Connection Reconfiguration signaling that may include frequency, bandwidth of additional carrier 2, dedicated radio resource allocation information, etc. Meanwhile, the base station adds additional carrier 2 to the downlink carrier set of the UE. After receiving the RRC Connection Reconfiguration signaling, the UE finds that a new additional carrier 2 is configured for it by the base station, and then it configures additional carrier 2 according to the information in the RRC Connection Reconfiguration signaling and immediately activates additional carrier 2, thereby starting to receive control information and data on the PDCCH and PDSCH of additional carrier 2, respectively. In that case, optionally, the UE may return a response signaling, such as RRC Connection Reconfiguration Complete signaling, to the base station to indicate that the configuration operation is completed. The UE will also add additional carrier 2 to its downlink carrier set. After additional carrier 2 is activated, both the base station and the UE set a timer 2 for additional carrier 2.

At the timing of $t_5$, when the downlink traffic volume of the UE is decreased, the base station and the UE simultaneously deactivate additional carrier 1 and additional carrier 2 and delete corresponding timer, in case the base station and the UE do not transmit or receive any control information or data on both additional carrier 1 and additional carrier 2, respectively, in successive X DRX cycles.

At the timing of $t_6$, when the signal quality of additional carrier 3 is better than that of additional carrier 2, the base station reconfigures the additional carriers of the UE according to the measurement report of the UE, i.e., to perform an additional carrier replacement by replacing additional carrier 2 in the downlink carrier set with additional carrier 3 of better signal quality, and indicate the UE to perform a corresponding additional carrier reconfiguration through a RRC Connection Reconfiguration signaling. In that case, the information carried in the RRC Connection Reconfiguration signaling includes: frequency of replaced additional carrier 2, frequency of replacing additional carrier 3, bandwidth of replacing additional carrier 3 and dedicated radio resource allocation information, etc. After receiving the signaling, the UE performs the additional carrier replacement and updates the information of the downlink carrier set. Then the downlink carrier set of the UE includes primary carrier 0, additional carrier 1 and additional carrier 3. In case additional carrier 2 is activated at the timing of replacement, the UE will configure and activate additional carrier 3 after receiving a RRC Connection Reconfiguration signaling. In case additional carrier 2 is deactivated at the timing of replacement, the UE will configure additional carrier 3 without activating it after receiving the RRC Connection Reconfiguration signaling. After updating the downlink carrier set, the UE may return a response signaling, such as a RRC Connection Reconfiguration Complete signaling, to the base station.

At the timing of $t_7$, after moving out of the coverage range of additional carrier 1, the UE cannot continue accepting any service on that additional carrier. In that case, since the measurement report of the UE cannot be received, the base station will reconfigure the downlink carrier set for the UE and notifies the UE through a RRC Connection Reconfiguration signaling. Information contained in the RRC Connection Reconfiguration signaling includes frequency of removed additional carrier 1, etc. After receiving the signaling, the UE updates the information of the downlink carrier set, so as to remove additional carrier 1 from the downlink carrier set. After the removal is completed, the UE may return a response signaling, such as a RRC Connection Reconfiguration Complete signaling, to the base station. Then the downlink carrier set of the UE includes primary carrier 0 and additional carrier 3.

The method for performing a carrier management in a carrier aggregation system is described as above by taking just one base station and one UE communicated therewith as an example. The actual carrier aggregation system may include one or more base stations, each corresponding to one or more UEs. The above method for performing a carrier management is suitable to each base station and each UE corresponding thereto.

In light of the above embodiment, processes of configuration, activation, deactivation and reconfiguration (including replacement and removal) of the additional carrier may be performed at the base station side according to the measurement result and the change of the downlink traffic volume of the UE. At the UE side, according to the downlink signaling, the signal reception quality over the additional carrier may be measured and the reception of control information on the PDCCH and data on the PDSCH of the additional carrier may be controlled. In addition, the method for performing a carrier management according to the present invention can reduce the data transmission delay and the UE power consumption.

Figure 11:
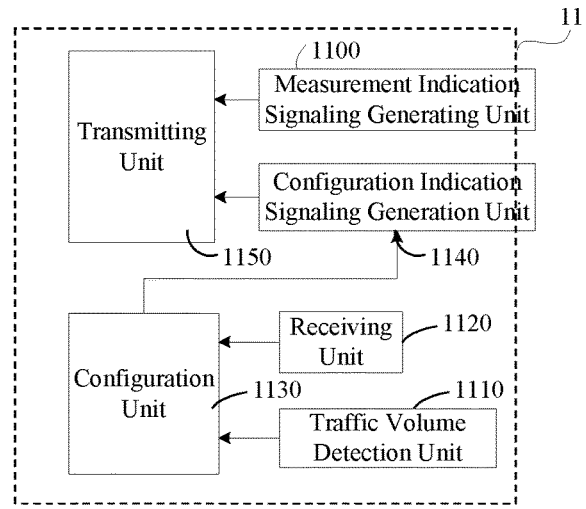
FIG. 11 illustrates a structural block diagram of a base station in an embodiment of the present invention.

The embodiments of the present invention further provide a base station for performing a carrier management in a carrier aggregation system. FIG. 11 illustrates a structural block diagram of a base station 11 in an embodiment of the present invention. FIG. 11 only illustrates the structure closely related to the solution of the present invention, and the base station 11 includes:

a measurement indication signaling generating unit 1100 configured to generate a signaling that carries an additional carrier measurement indication, which is preferably a RRC signaling;

a traffic volume detection unit 1110 configured to detect a downlink traffic volume of a UE;

a receiving unit 1120 configured to receive an additional carrier measurement report from the UE;

a configuration unit 1130 configured to perform an additional carrier configuration operation for the UE according to the additional carrier measurement report received by the receiving unit when the traffic volume detection unit detects that an increase of the downlink traffic volume of the UE makes carriers in a recorded current downlink carrier set of the UE do not meet the requirement of a data rate of the downlink traffic volume, the additional carrier configuration operation comprising configuring and activating at least one additional carrier, and adding the at least one additional carrier to the downlink carrier set;

a configuration indication signaling generation unit 1140 configured to generate a signaling that carries a configuration indication to indicate the UE to perform corresponding configuration operation, the signaling that carries the configuration indication is preferably a RRC signaling; and a transmitting unit 1150 configured to transmit the signaling that carries the additional carrier measurement indication and the signaling that carries the configuration indication.

It shall be appreciated that various parts described in the embodiments of the present invention may be implemented through hardware, software, firmware or a combination thereof.

It shall also be appreciated that two or more units in the base station described in the embodiments of the present invention may be merged into one unit, and each unit may also be divided into multiple sub-units, without influencing the implementation of the present invention.

Figure 12:
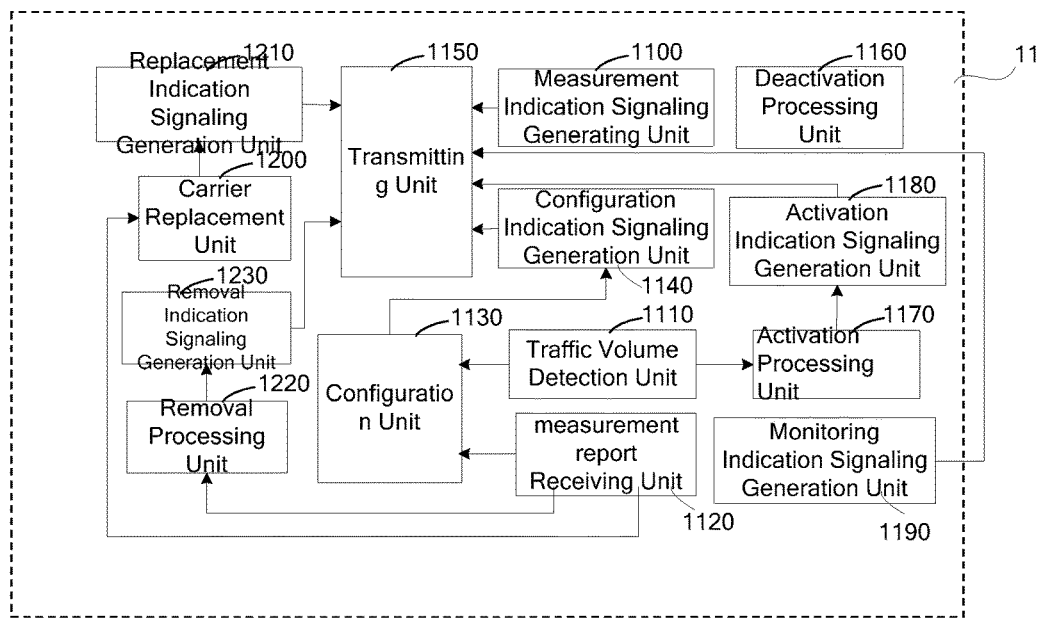
FIG. 12 illustrates a structural block diagram of a base station in another embodiment of the present invention.

In another embodiment of the present invention, as illustrated in FIG. 12, the base station 11 further comprising:

a deactivation processing unit 1160 configured to perform a deactivation operation on at least one activated additional carrier for the UE according to the downlink traffic volume of the UE when the downlink traffic volume of the UE is decreased. For example, the deactivation processing unit 1160 may perform a deactivation operation on at least one activated additional carrier for the UE according to the downlink traffic volume of the UE when control information or data is not transmitted on the at least one activated additional carrier in the downlink carrier set in a predetermined number (e.g., X, X is preferably but not limited to an integer larger than 1) of DRX cycles in succession.

In another embodiment of the invention, the base station 11 further comprising:

an activation processing unit 1170 configured to, when the downlink traffic volume of the UE is increased, perform an activation operation on at least one deactivated additional carrier in the downlink carrier set for the UE in case the carriers in the recorded current downlink carrier set of the UE meet the requirement of a bandwidth of the downlink traffic volume; and an activation indication signaling generation unit 1180 configured to generate a signaling that carries an activation indication.

In that case, the transmitting unit 1150 is further configured to transmit the signaling that carries the activation indication to the UE to indicate the UE to perform corresponding activation operation.

In a preferred embodiment of the present invention, the signaling that carries the activation indication generated by the activation indication signaling generation unit 1180 is a MAC signaling having a MAC PDU. The MAC PDU includes a MAC header and a MAC payload, wherein the MAC payload includes DRX command MAC CE of a predetermined size, which includes available bits and reserved bits. Each available bit is corresponding to each carrier in the downlink carrier set of the UE, and the activation indication is a predetermined value of an available bit corresponding to at least one deactivated additional carrier in the downlink carrier set.

In another embodiment of the present invention, the base station further comprising:

a monitoring indication signaling generation unit 1190 configured to generate a signaling that carries a monitoring indication.

In that case, the transmitting unit 1150 is further configured to transmit the signaling that carries the monitoring indication to the UE to indicate the UE whether or not to monitor a PDCCH of at least one activated additional carrier in the downlink carrier set.

In a preferred embodiment of the present invention, the signaling that carries the monitoring indication generated by the monitoring indication signaling generation unit 1190 is a MAC signaling having a MAC PDU. The MAC PDU includes a MAC header and a MAC payload, wherein the MAC payload includes DRX command MAC CE of a predetermined size, which includes available bits and reserved bits. Each available bit is corresponding to each carrier in the downlink carrier set of the UE, and the monitoring indication is a predetermined value of an available bit corresponding to at least one activated additional carrier in the downlink carrier set.

In another embodiment of the present invention, the base station further comprising:

a carrier replacement unit 1200 configured to replace, during a service connection of the UE, an additional carrier of worst signal quality in the downlink carrier set with an additional carrier of better signal quality beyond the downlink carrier set when it is determined that the additional carrier of better signal quality is existed beyond the downlink carrier set, wherein the additional carrier of better signal quality refers to an additional carrier having a signal quality better than the signal quality of at least one additional carrier in the downlink carrier set; and a replacement indication signaling generation unit 1210 configured to generate a signaling that carries a replacement indication, which is preferably a RRC signaling.

In that case, the transmitting unit is further configured to transmit the signaling that carries the replacement indication (e.g., the RRC signaling) to the UE to indicate the UE to perform corresponding replacement.

In another embodiment of the present invention, the base station further comprising:

a removal processing unit 1220 configured to, during a service connection of the UE, remove an additional carrier having a signal quality strength lower than a predetermined threshold from the downlink carrier set, when it is determined according to the measurement report that the additional carrier having the signal quality strength lower than the predetermined threshold is existed in the downlink carrier set; and a removal indication signaling generation unit 1230 configured to generate a signaling that carries a removal indication, which is preferably a RRC signaling.

In that case, the transmitting unit is further configured to transmit the signaling that carries the removal indication (e.g., the RRC signaling) to the UE to indicate the UE to perform corresponding removal operation.

Figure 13:
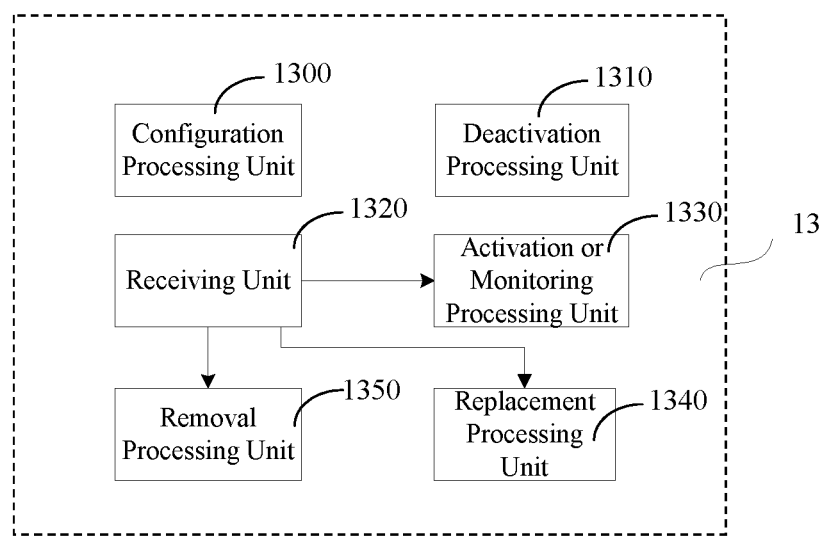
FIG. 13 illustrates a structural block diagram of a UE in an embodiment of the present invention.

Accordingly, the embodiments of the present invention further provide a UE 13 communicating with the base station. The UE further comprising the following structures as illustrated in FIG. 13 in addition to structures and functions of the conventional UE:

a configuration processing unit 1300 configured to, when the downlink traffic volume is increased, perform an additional carrier configuration operation according to a signaling that carries a configuration indication from a base station, the additional carrier configuration operation comprising configuring and activating at least one additional carrier, and adding the at least one additional carrier to the downlink carrier set; and a deactivation processing unit 1310 configured to, when the downlink traffic volume is decreased, perform a deactivation operation on at least one activated additional carrier in the downlink carrier set in case a deactivation indication for the at the least one additional carrier in the downlink carrier set is received from the base station, or control information or data is not received on the at least one additional carrier in the downlink carrier set during a predetermined number (e.g., X, X is preferably but not limited to an integer larger than 1) of DRX cycles in succession.

In another embodiment of the present invention, the UE 13 further comprising:

a receiving unit 1320 configured to receive a MAC signaling from the base station; and an activation or monitoring processing unit 1330 configured to determine whether or not to activate an additional carrier or monitor a PDCCH of an activated additional carrier, according to bit information in the MAC signaling corresponding to the carrier in the downlink carrier set.

The MAC signaling includes a MAC PDU. The MAC PDU includes a MAC header and a MAC payload, wherein the MAC payload includes DRX command MAC CE of a predetermined size, which includes available bits and reserved bits. Each available bit is corresponding to each carrier in the downlink carrier set of the UE, wherein for any additional carrier in the downlink carrier set: when an available bit corresponding to the additional carrier is set as a first value, the activation or monitoring processing unit activates the additional carrier in case the additional carrier is in a deactivated state; the activation or monitoring processing unit stops monitoring the PDCCH on the additional carrier in case the additional carrier is in an activated state and monitors the PDCCH on the additional carrier; and the activation or monitoring processing unit starts to monitor the PDCCH on the additional carrier in case the additional carrier is in an activated state and does not monitor the PDCCH on the additional carrier.

In another embodiment of the present invention, the receiving unit 1320 is further configured to receive a RRC signaling that carries a replacement indication from the base station when an additional carrier of better signal quality is existed beyond the downlink carrier set. In that case, the UE 13 further comprising: a replacement processing unit 1340 configured to replace an additional carrier of worst signal quality in the downlink carrier set with the additional carrier of better signal quality beyond the downlink carrier set according to the RRC signaling, wherein the additional carrier of better signal quality refers to an additional carrier having a signal quality better than the signal quality of at least one additional carrier in the downlink carrier set.

In another embodiment of the present invention, the receiving unit 1320 is further configured to receive a RRC signaling that carries a removal indication from the base station, when an additional carrier having a signal quality strength lower than a predetermined threshold is existed in the downlink carrier set. In that case, the UE 13 further comprising a removal processing unit 1350 configured to remove the additional carrier having the signal quality strength lower than the predetermined threshold from the downlink carrier set according to the RRC signaling.

It shall be appreciated that various parts described in the above embodiments may be implemented through hardware, software, firmware or a combination thereof.

It shall also be appreciated that two or more units in the UE described in the above embodiments may be merged into one unit, and each unit may also be divided into multiple sub-units, without influencing the implementation of the present invention.

Features described and/or illustrated with respect to one embodiment in the present invention can be used in one or more other embodiments in a same or similar way, and/or combine with or replace features in other embodiments.

In the above embodiments of the present invention, the steps or methods can be implemented with software or firmware stored in a memory and executed by an appropriate instruction execution system.

Any process or method description or block in the flowcharts or described in other way can be understood as representing one or more modules, segments or portions including codes of executable instructions for implementing specific logic function or in steps in process, and the range of the preferred embodiments include other implementations, wherein the functions may be executed other than the order illustrated or discussed, including in a substantially simultaneous manner based on concerned function or in an inverse order, and this shall be appreciated by a person skilled in the art.

The logics and/or steps in the flowcharts or described in other ways, for example may be regarded as an ordered list of executable instructions for implementing the logic functions, and can be embodied in any computer readable medium, so as to be used by an instruction execution system, an apparatus or a device (e.g., computer-based system, system including processor, or other system that can extract instruction from the instruction execution system, the apparatus or the device and then execute the instruction), or used in conjunction therewith. In the Specification, "computer readable medium" may be any apparatus that can include, store, communicate, propagate or transmit program to be used by an instruction execution system, apparatus or device, or used in conjunction therewith. The computer readable medium for example may be, but not limited to, electronic, magnetic, optical, electromagnetic, infrared or semiconductor system, apparatus, device or propagation medium. More detailed examples of the computer readable medium include (non-exhaustive list): electrical connection portion (electronic apparatus) having one or more wirings, portable computer disk (magnetic apparatus), random access memory (RAM) (electronic apparatus), read only memory (ROM) (electronic apparatus), Erasable Programmable Read Only Memory (EPROM or flash memory) (electronic apparatus), optical fiber (optical apparatus), and portable compact disc-read only memory (CDROM) (optical apparatus). Besides, a program can be electronically captured by optically scanning a paper sheet or other medium on which the program is printed, then the program is compiled, interpreted, or processed in other appropriate way when necessary, next the program is stored in the computer memory, thus the computer readable medium even may be a paper sheet or other appropriate medium on which the program is printed.

The above descriptions and drawings illustrate various different features of the present invention. It shall be appreciated that a person skilled in the art can implement the above described and illustrated steps and processes by compiling appropriate computer codes. It also shall be appreciated that the above described terminals, computers, servers and networks, etc. may be any type, and the computer codes can be compiled based on the disclosure so as to implement the present invention with the apparatus disclosed herein.

Although the concrete features of the present invention are described with respect to one or more exemplary embodiments, those features may be combined with one or more other features in other embodiments upon the request and in consideration of the aspect beneficial to any given or concrete application.

Finally to be noted, the term "include/comprise" or any other variant intends to cover a non-exclusive inclusion, so that process, method, article or device comprising a series of elements comprise not only those elements, but also other elements not listed explicitly, or further comprise inherent elements of the process, method, article or device.

Although the embodiments of the present invention are described in details with reference to the drawings, it shall be appreciated that the embodiments described above are just adopted to illustrate the present invention and do not constitute a limitation to the present invention. A person skilled in the art may perform various modifications and changes to the above embodiments without deviating from the essence and range of the present invention. Therefore, the range of the present invention is only defined by the accompanied claims and their equivalents.

What is claimed is:

1. A method performed by a base station for a carrier configuration and activation in a carrier aggregation system, comprising:
    transmitting a first signaling to configure at least one additional carrier to a user equipment (UE) at which the additional carriers are deactivated, and to configure a timer to each additional carrier for the UE by which the carrier is deactivated after the timer expiry;
    transmitting a second signaling that carries an activation indication to the UE to indicate the UE to activate at least one deactivated additional carrier in the configured carriers for the UE;
    activating the at least one deactivated additional carrier and controlling the UE to start Physical Downlink Control Channel (PDCCH) monitoring for the activated additional carrier and Physical Downlink Shared Channel (PDSCH) receiving on the activated additional carrier;
    transmitting PDCCH, which is on the primary carrier or on one other activated additional carrier, for the activated additional carrier for the UE, by which the timer being restarted; and
    deactivating the activated additional carrier after the corresponding timer expiry and controlling the UE to stop the PDCCH monitoring for the activated additional carrier and the PDSCH receiving on the deactivated additional carrier.

2. A method performed by a user equipment (UE) that performs carrier activation in a carrier aggregation system, the method comprising:
    receiving a first signaling to configure at least one additional carrier transmitted from a base station, and to configure a timer to each additional carrier for the UE by which the carrier is deactivated after the timer expiry;
    receiving a second signaling that carries an activation indication to indicate the UE to activate at least one deactivated additional carrier in the configured carriers for the UE; and
    activating at least one deactivated additional carrier in the configured carriers for the UE according to the second signaling, and starting the PDCCH monitoring for the additional carrier and PDSCH receiving on the activated additional carrier; and
    restarting the timer by PDCCH, which is on the primary carrier or on one other activated additional carrier, for the activated additional carrier for the UE; and
    deactivating the activated additional carrier after the corresponding timer expiry and stopping the PDCCH monitoring for the additional carrier and the PDSCH receiving on the deactivated additional carrier.

3. A base station that performs carrier activation in a carrier aggregation system, comprising:
    a transmitting unit that transmit a first signaling to configure at least one additional carrier to a user equipment (UE) at which the additional carriers are deactivated, and to configure a timer to each additional carrier for the UE by which the carrier is deactivated after the timer expiry, and transmit a second signaling that carries an activation indication to the UE to indicate the UE to activate at least one deactivated additional carrier in the configured carriers for the UE;
    a processor that activates the at least one deactivated additional carrier and controls the UE to start PDCCH monitoring for the activated additional carrier and PDSCH receiving on the activated additional carrier; and
    the processor deactivates the activated additional carrier after the corresponding timer expiry and controls the UE to stop the PDCCH monitoring for the additional carrier and the PDSCH receiving on the deactivated additional carrier;
    wherein the base station transmits PDCCH, which is on the primary carrier or on one other activated additional carrier, for the activated additional carrier for the UE, by which the timer being restarted.

4. A user equipment (UE) in a carrier aggregation system, comprising:
    a receiving unit that receives a first signaling to configure at least one additional carrier transmitted from a base station, and to configure a timer to each additional carrier for the UE by which the carrier is deactivated after the timer expiry, and receives a second signaling that carries an activation indication to indicate the UE to activate at least one deactivated additional carrier in the configured carriers for the UE;
    a processor that activates at least one deactivated additional carrier in a configured carriers for the UE according to the second signaling and starts the PDCCH monitoring for the additional carrier and PDSCH receiving on the activated additional carrier; and
    the processor deactivates at least one activated additional carrier after the corresponding timer expiry and stops the PDCCH monitoring for the additional carrier and PDSCH receiving on the deactivated additional carrier;
    wherein the UE restarts the timer by PDCCH, which is on the primary carrier or on one other activated additional carrier, for the activated additional carrier for the UE.

5. A communication system in which a communication is performed using carrier aggregation, the communication system comprising:
    a base station; and
    a user equipment;
    wherein the base station includes,
    a transmitting unit that transmit a first signaling to configure at least one additional carrier to a user equipment (UE) at which the additional carriers are deactivated, and to configure a timer to each additional carrier for the UE by which the carrier is deactivated after the timer expiry, and transmit a second signaling that carries an activation indication to the UE to indicate the UE to activate at least one deactivated additional carrier in the configured carriers for the UE;
    a first processor that activates the at least one deactivated additional carrier and controls the UE to start PDCCH monitoring for the activated additional carrier and PDSCH receiving on the activated additional carrier; and the first processor deactivates the activated additional carrier after the corresponding timer expiry and controls the UE to stop PDCCH monitoring for the activated additional carrier and PDSCH receiving on the deactivated additional carrier, and wherein the base station transmits PDCCH, which is on the primary carrier or on one other activated additional carrier, for the activated additional carrier for the UE, by which the timer being restarted; and wherein the UE includes, a receiving unit that receives the first signaling, and to configure the timer to each additional carrier for the UE by which the carrier is deactivated after the timer expiry, and receives the second signaling;

a second processor that activates at least one deactivated additional carrier in the configured carriers for the UE according to the second signaling and starts the PDCCH monitoring for the activated additional carrier and PDSCH receiving on the activated additional carrier; and the second processor deactivates at least one activated additional carrier after the corresponding timer expiry and stops the PDCCH monitoring for the activated additional carrier and PDSCH receiving on the deactivated additional carrier, wherein the UE restarts the timer by PDCCH, which is on the primary carrier or on one other activated additional carrier, for the activated additional carrier for the UE.

* * * * *